(12) United States Patent
De Pasquale et al.

(10) Patent No.: US 10,231,284 B2
(45) Date of Patent: Mar. 12, 2019

(54) TELECOMMUNICATION SYSTEM

(71) Applicant: VODAFONE IP LICENSING LIMITED, Newbury, Berkshire (GB)

(72) Inventors: Andrea De Pasquale, Madrid (ES); Francisco Javier Dominguez Romero, Madrid (ES); Yannick Le Pezennec, Madrid (ES); Santiago Tenorio Sanz, Madrid (ES)

(73) Assignee: VODAFONE IP LICENSING LIMITED, Newbury, Berkshire (GB)

(*) Notice: Subject to any disclaimer, the term of this patent is extended or adjusted under 35 U.S.C. 154(b) by 0 days.

(21) Appl. No.: 15/518,538

(22) PCT Filed: Oct. 9, 2015

(86) PCT No.: PCT/EP2015/073353
§ 371 (c)(1),
(2) Date: Apr. 12, 2017

(87) PCT Pub. No.: WO2016/058916
PCT Pub. Date: Apr. 21, 2016

(65) Prior Publication Data
US 2017/0245161 A1    Aug. 24, 2017

(30) Foreign Application Priority Data
Oct. 13, 2014 (EP) .................... 14382390

(51) Int. Cl.
*H04W 40/00* (2009.01)
*H04W 84/04* (2009.01)
(Continued)

(52) U.S. Cl.
CPC ............ *H04W 84/04* (2013.01); *H04L 5/001* (2013.01); *H04L 5/0035* (2013.01);
(Continued)

(58) Field of Classification Search
USPC ...................... 370/230, 315, 294; 455/1, 436
See application file for complete search history.

(56) References Cited

U.S. PATENT DOCUMENTS 7,433,922 B2   10/2008 Engstrom
7,831,252 B2 * 11/2010 Shang ................... H04W 36/30
                                                     455/436

(Continued)

FOREIGN PATENT DOCUMENTS

EP    1551194    7/2005
EP    1587271    10/2005
(Continued)

OTHER PUBLICATIONS

International Search Report and Written Opinion issud in PCT/EP2015/073353 dated Jan. 13, 2016.
(Continued)

*Primary Examiner* — David Q Nguyen
(74) *Attorney, Agent, or Firm* — Workman Nydegger

(57) ABSTRACT

A cellular telecommunications network architecture is described where certain UEs are configured to assist the network to improve coverage in regions of poor radio conditions. In certain embodiments, appropriate UEs are selected to act as a dynamic, out-of-band coverage extensions. Network performance can thereby be improved when serving users at the cell edge (or in other poor radio condition regions of a cell).

16 Claims, 8 Drawing Sheets

Aggregation mode inactive – Macro cell active

Aggregation mode gets activated by selector (only where necessary/useful)

(51) Int. Cl.

| | | |
|---|---|---|
| *H04W 76/15* | (2018.01) | |
| *H04L 5/00* | (2006.01) | |
| *H04W 16/26* | (2009.01) | |
| *H04W 36/24* | (2009.01) | |
| *H04W 52/02* | (2009.01) | |
| *H04W 64/00* | (2009.01) | |
| *H04W 88/04* | (2009.01) | |
| *H04W 36/32* | (2009.01) | |
| *H04W 24/08* | (2009.01) | |
| *H04W 76/10* | (2018.01) | |
| *H04W 88/10* | (2009.01) | |
| *H04W 36/04* | (2009.01) | |

(52) U.S. Cl.
CPC ........... *H04L 5/0098* (2013.01); *H04W 16/26* (2013.01); *H04W 24/08* (2013.01); *H04W 36/24* (2013.01); *H04W 36/32* (2013.01); *H04W 52/0238* (2013.01); *H04W 52/0254* (2013.01); *H04W 64/006* (2013.01); *H04W 76/10* (2018.02); *H04W 76/15* (2018.02); *H04W 88/04* (2013.01); *H04W 36/04* (2013.01); *H04W 52/0258* (2013.01); *H04W 52/0277* (2013.01); *H04W 84/045* (2013.01); *H04W 84/047* (2013.01); *H04W 88/10* (2013.01); *Y02D 70/00* (2018.01); *Y02D 70/122* (2018.01); *Y02D 70/1242* (2018.01); *Y02D 70/1244* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/23* (2018.01)

(56) References Cited

U.S. PATENT DOCUMENTS

| | | | |
|---|---|---|---|
| 9,344,962 B2* | 5/2016 | Breitbach | H04W 52/02 |
| 9,432,931 B2* | 8/2016 | Roebke | H04W 36/14 |
| 2006/0088004 A1 | 4/2006 | Casey et al. | |
| 2008/0080436 A1 | 4/2008 | Sandhu et al. | |
| 2009/0135795 A1 | 5/2009 | Lim et al. | |
| 2009/0286465 A1 | 11/2009 | Lin et al. | |
| 2010/0110968 A1 | 5/2010 | Lee et al. | |
| 2010/0167743 A1 | 7/2010 | Palanki et al. | |
| 2010/0195562 A1 | 8/2010 | Ishizu et al. | |
| 2010/0317286 A1 | 12/2010 | Jung et al. | |
| 2011/0128916 A1 | 6/2011 | Kwon et al. | |
| 2011/0235514 A1 | 9/2011 | Huang et al. | |
| 2011/0249609 A1 | 10/2011 | Brusilovsky et al. | |
| 2011/0292862 A1* | 12/2011 | Shimizu | H04B 7/15528 370/315 |
| 2011/0305339 A1 | 12/2011 | Norrman et al. | |
| 2012/0083202 A1* | 4/2012 | Sawamoto | H04W 52/46 455/9 |
| 2012/0106404 A1 | 5/2012 | Damnjanovic | |
| 2012/0157146 A1 | 6/2012 | Theisen et al. | |
| 2012/0281685 A1 | 11/2012 | Kotecha et al. | |
| 2013/0094486 A1 | 4/2013 | Bhanage et al. | |
| 2013/0169348 A1 | 7/2013 | Shi | |
| 2013/0201956 A1 | 8/2013 | Cho et al. | |
| 2013/0281021 A1 | 10/2013 | Palin et al. | |
| 2013/0331093 A1 | 12/2013 | Cho et al. | |
| 2013/0337872 A1 | 12/2013 | Fertl et al. | |
| 2014/0148211 A1 | 5/2014 | Mountford et al. | |
| 2014/0155019 A1 | 6/2014 | Schwartz | |
| 2014/0169262 A1 | 6/2014 | Noh et al. | |
| 2014/0169268 A1 | 6/2014 | Hampel | |
| 2014/0220905 A1 | 8/2014 | Buckley et al. | |
| 2014/0376426 A1* | 12/2014 | Boudreau | H04L 47/41 370/294 |
| 2015/0117185 A1* | 4/2015 | Kim | H04W 28/0247 370/230 |
| 2016/0157076 A1 | 6/2016 | Schwartz | |
| 2016/0381725 A1 | 12/2016 | Spinelli | |
| 2017/0205812 A1* | 7/2017 | Clayton | G05B 19/41855 |

FOREIGN PATENT DOCUMENTS

| | | |
|---|---|---|
| EP | 2306766 | 4/2011 |
| EP | 2442605 | 4/2012 |
| EP | 2479908 | 7/2012 |
| EP | 2496045 | 9/2012 |
| EP | 2744297 | 6/2014 |
| EP | 2763477 | 8/2014 |
| GB | 2475906 | 6/2011 |
| GB | 2503719 | 1/2014 |
| GB | 2510897 | 8/2014 |
| WO | 2003065757 | 8/2003 |
| WO | 2006138122 | 12/2006 |
| WO | 2008015562 | 2/2008 |
| WO | 2008105771 | 9/2008 |
| WO | 2008107625 | 9/2008 |
| WO | 2009097070 | 8/2009 |
| WO | 2009149023 | 12/2009 |
| WO | 2010006649 | 1/2010 |
| WO | 2010076773 | 7/2010 |
| WO | 2010151047 | 12/2010 |
| WO | 2011019976 | 2/2011 |
| WO | 2011023226 | 3/2011 |
| WO | 2011153507 | 12/2011 |
| WO | 2012015411 | 2/2012 |
| WO | 2012039656 | 3/2012 |
| WO | 2012055114 | 5/2012 |
| WO | 2013044979 | 4/2013 |
| WO | 2013130498 | 9/2013 |
| WO | 2013142361 | 9/2013 |
| WO | 2014098702 | 6/2014 |

OTHER PUBLICATIONS

Office Action issued in U.S. Appl. No. 15/518,540 dated Jun. 14, 2018.
International Search Report and Written Opinion issued in PCT/EP2015/073353 dated Jan. 13, 2016.
European Search Report issued in EP14382390 dated Apr. 17, 2015.
International Search Report and Written Opinion issued in PCT/EP2015/073357 dated Feb. 10, 2016.
European Search Report issued in EP14382497.7 dated Feb. 9, 2016.
European Search Report issued in EP14382499.3 dated Feb. 2, 2016.
International Search Report and Written Opinion issued in PCT/EP2015/073360 dated Feb. 10, 2016.
European Search Report issued in EP15382033 dated Feb. 2, 2016.
International Search Report and Written Opinion issued in PCT/EP2015/073378 dated Feb. 10, 2016.
European Search Report issued in EP14382572 dated Feb. 2, 2016.
International Search Report and Written Opinion issued in PCT/EP2015/073376 dated Feb. 10, 2016.
European Search Report issued in EP15382031 dated Feb. 2, 2016.
International Search Report and Written Opinion issued in PCT/EP2015/073388 dated Feb. 10, 2016.
International Search Report and Written Opinion issued in PCT/EP2015/073676 dated Apr. 21, 2016.
Partial European Search Report issued in EP14382571 dated Feb. 9, 2016.
European Search Report issued in EP15382323 dated Feb. 2, 2016.
International Search Report and Written Opinion issued in PCT/EP2015/073391 dated Feb. 2, 2016.
International Search Report and Written Opinion issued in PCT/EP2015/073399 dated Feb. 2, 2016.
European Search Report issued in EP15382400 dated Feb. 5, 2016.
International Search Report and Written Opinion issued in PCT/EP2015/073393 dated Feb. 16, 2016.
European Search Report issued in EP15382402 dated Feb. 4, 2016.

(56) References Cited

OTHER PUBLICATIONS

International Search Report and Written Opinion issued in PCT/EP2015/073395 dated Feb. 16, 2016.
European Search Report issued in EP15382399 dated Feb. 2, 2016.
International Search Report and Written Opinion issued in PCT/EP2015/073397 dated Feb. 10, 2016.
International Search Report and Written Opinion issued in PCT/EP2015/073402 dated Feb. 22, 2016.
International Search Report and Written Opinion issued in PCT/EP2015/073721 dated Mar. 15, 2016.
International Search Report and Written Opinion issued in PCT/EP2015/073698 dated Feb. 26, 2016.
International Search Report and Written Opinion issued in PCT/EP2015/073680 dated Mar. 23, 2016.
International Search Report and Written Opinion issued in PCT/EP2015/073713 dated Feb. 29, 2016.
International Search Report and Written Opinion issued in PCT/EP2015/073724 dated Feb. 16, 2016.
International Search Report and Written Opinion issued in PCT/EP2015/073701 dated Mar. 9, 2016.
SA3 "Living Document on Key Security Issues of Relay Node Architectures" 3GPP Draft, Jul. 5, 2010.
"3rd Generation Partnership Project: Technical Specification Group Radio Access Network; Evolved Universal Terrestrial Radio Access (E-UTRA); Relay Architectures for E-UTRA (LTE-Advanced) (Release 9)" Apr. 21, 2010.
International Search Report and Written Opinion issued in PCT/EP2015/073725 dated Mar. 22, 2016.
International Search Report and Written Opinion issued in PCT/EP2015/073708 dated Mar. 9, 2016.
International Search Report and Written Opinion issued in PCT/EP2015/068219 dated Oct. 4, 2016.
Office Action issued in U.S. Appl. No. 15/518,540 dated Oct. 26, 2018.
Office Action issued in U.S. Appl. No. 15/518,542 dated Nov. 29, 2018.

* cited by examiner

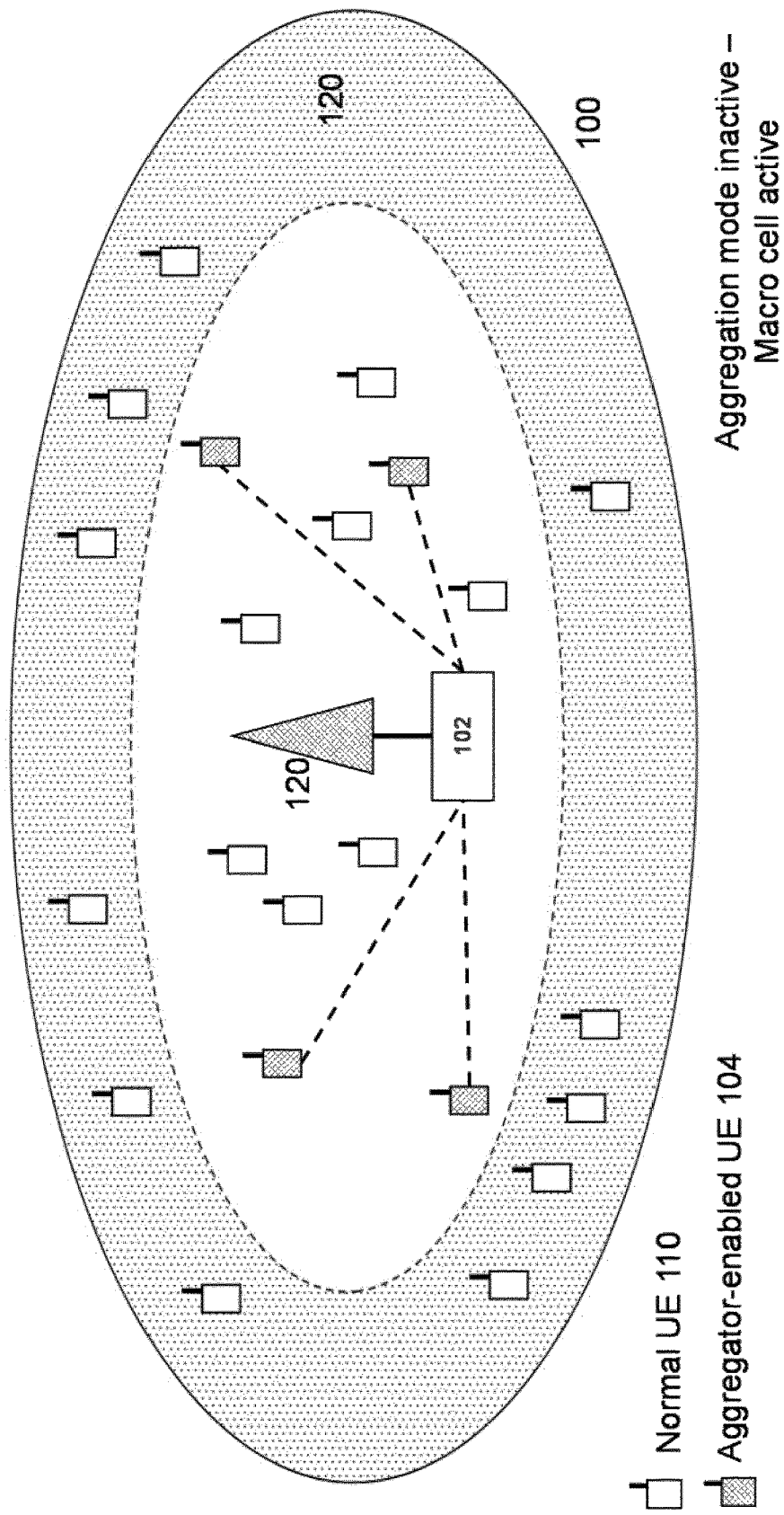

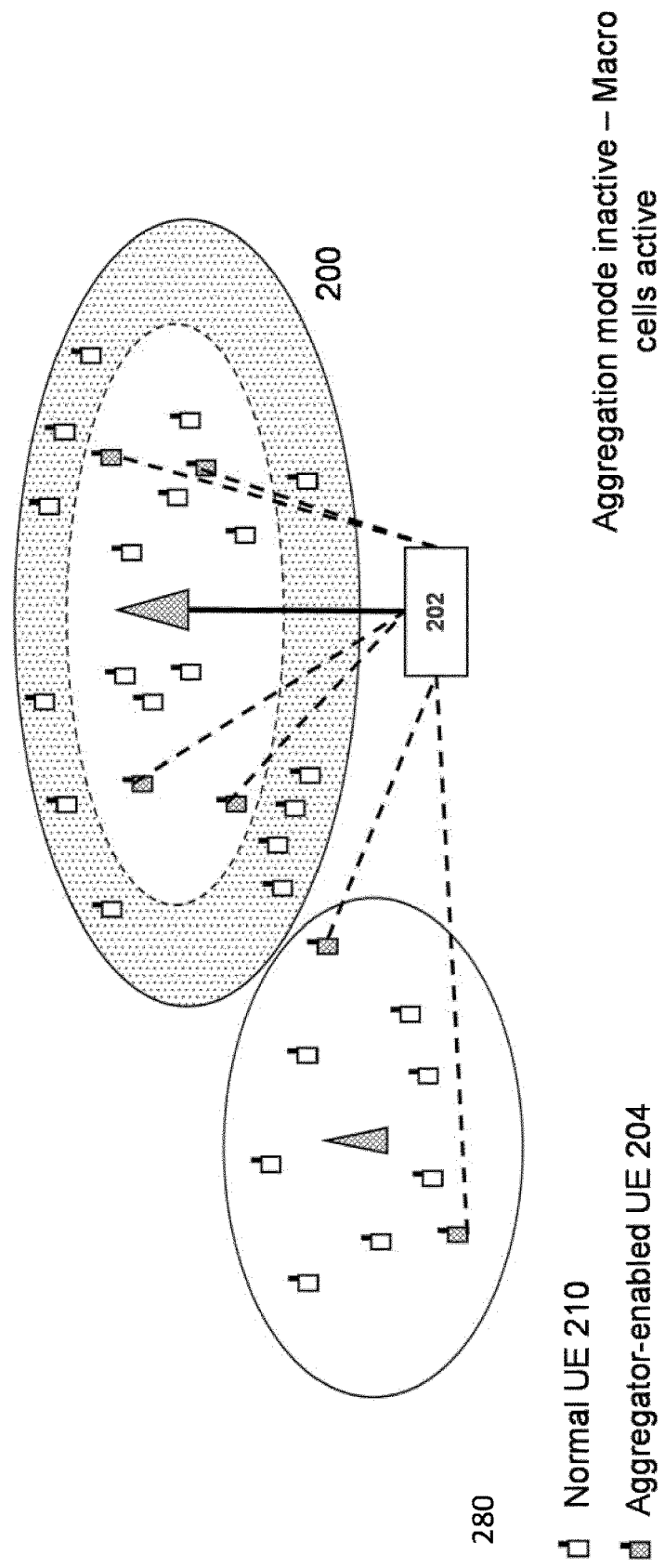

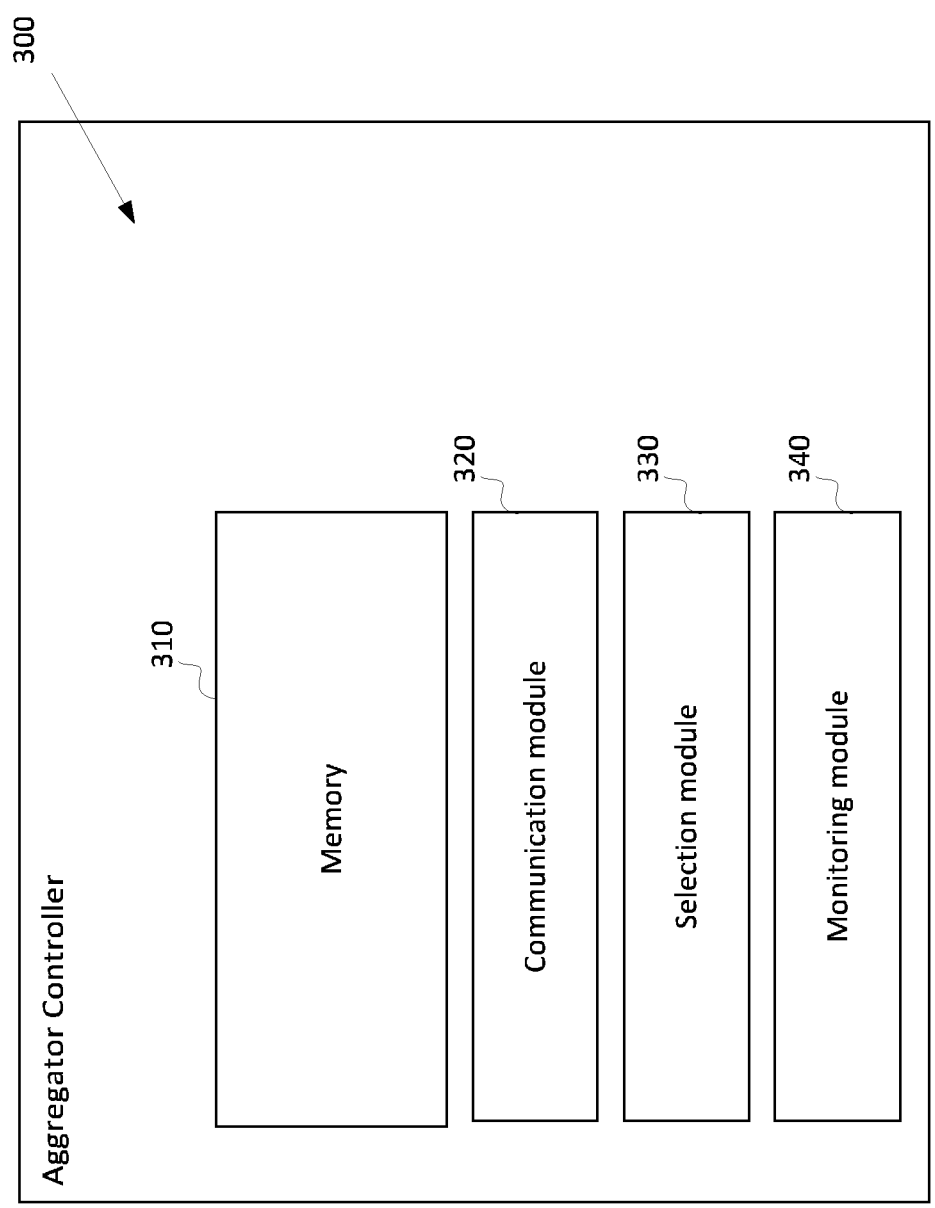

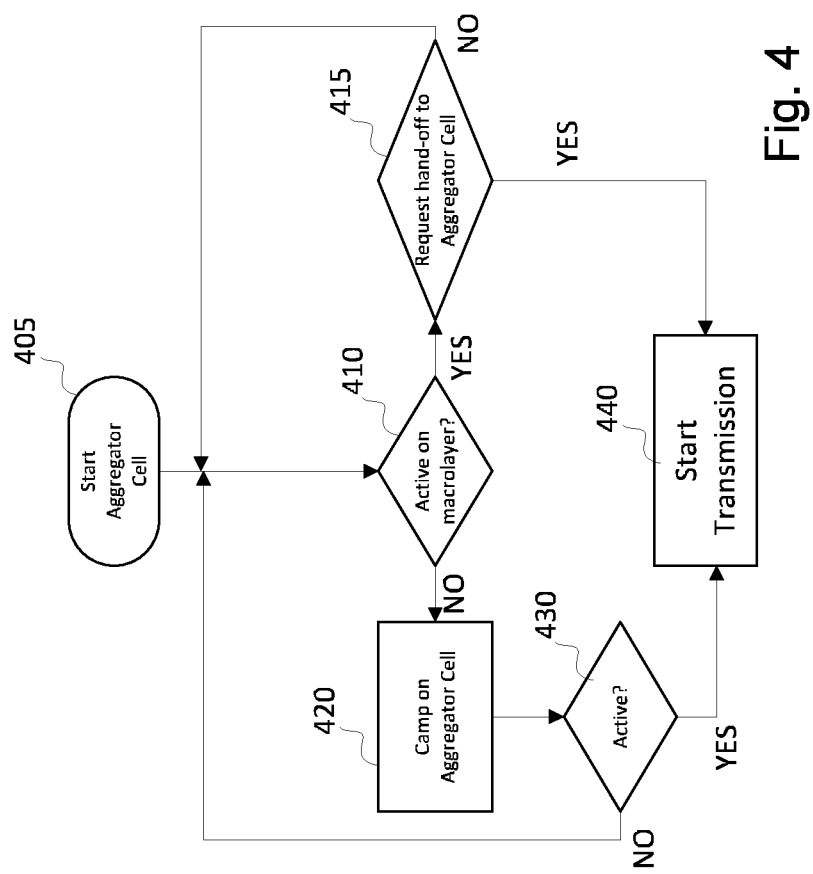

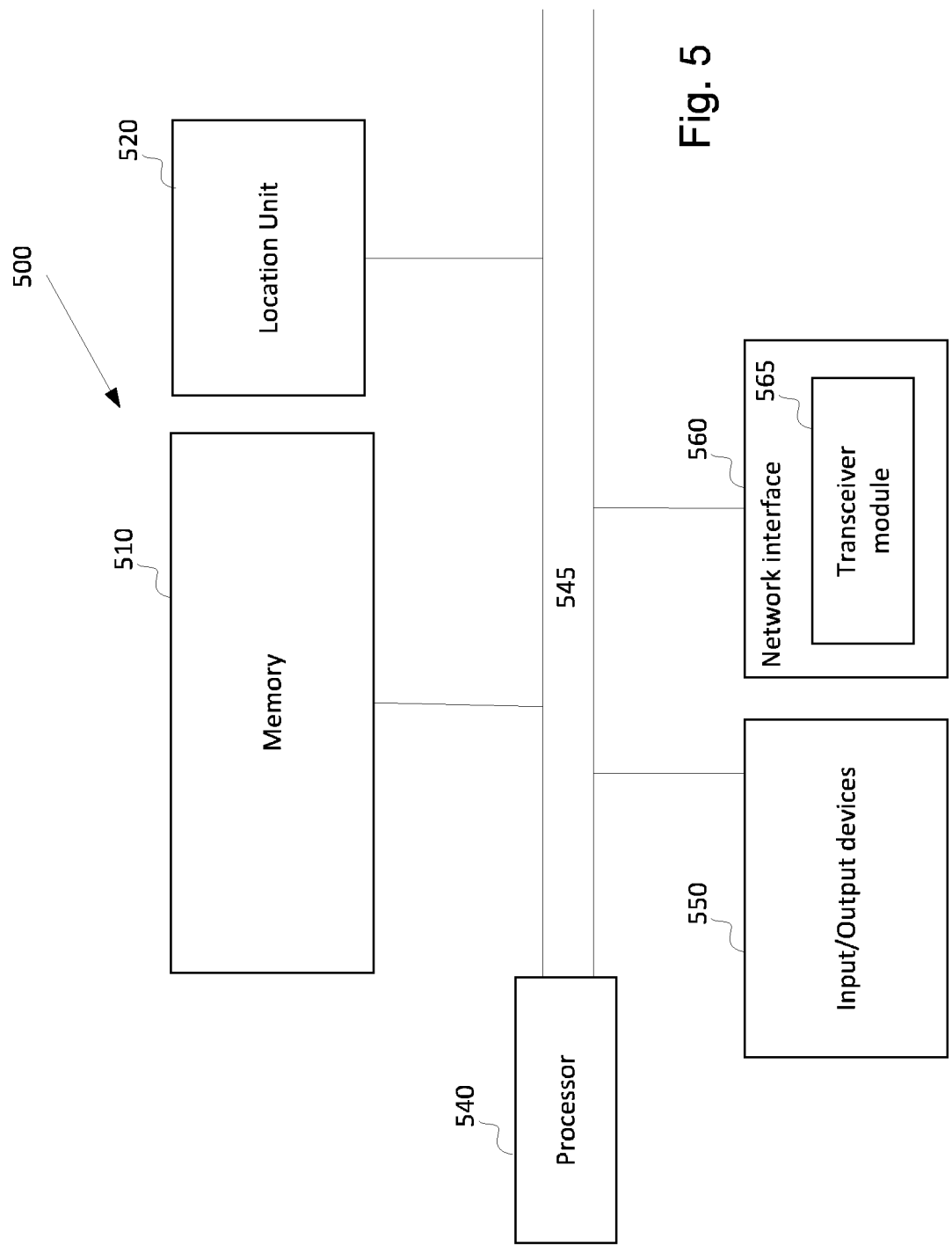

TELECOMMUNICATION SYSTEM

CROSS REFERENCE TO RELATED APPLICATIONS

This application is a U.S. Nationalization of PCT Application Number PCT/EP2015/073353, filed on Oct. 9, 2015, which claims priority to EP Patent Application No. 14382390.4 filed on Oct. 13, 2014, the entireties of which are incorporated herein by reference.

FIELD OF THE DISCLOSURE

This disclosure relates to a telecommunication system. In particular the disclosure relates to a telecommunication system that provides wireless wide area communications in cellular telecommunications networks.

BACKGROUND TO THE INVENTION

Cellular telecommunications networks characteristically provide "cells" of radio communication coverage between communication devices (which are typically mobile) and a core network (with a "downlink" from core network to communication device and an "uplink" in the opposite direction).

Various radio access technologies (RATs) are implemented: currently digital cellular networks are the most common and these are loosely classed as second generation (2G), third generation (3G), fourth generation (4G), etc. technologies according to whether the RAT achieves effective data communications that meet increasingly challenging requirements. In meeting these requirements, the make different uses of the available radio frequency (RF) bandwidth: neighbouring cells in 2G technologies, for example, are deployed so that they use RF bandwidth at different frequencies to avoid interference.

To ensure effective coverage of a large geographic area, a plurality of cells are provided by respective network nodes referred to variously as base transceiver stations and base stations. Base (transceiver) stations are associated with one or more antenna arrays which in turn establish respective cells. They are controlled at least in part by other entities in the core network known as controllers (in 3G technologies such as UMTS these are referred to as radio network controllers, RNCs). More recently certain categories of base transceiver stations, referred to as eNodeBs or eNBs in the context of LTE, implement both base station functionality and at least some controller functionality. The antenna arrays (and thus, often, the base stations) are geographically distributed so that the coverage of each cell typically overlaps with that of neighbouring cells only at the cell edge. The RATs aim to ensure that communication devices are provided with continuous coverage even if they are moving from the coverage of a first cell to that of a second across the cell edge region: to do this they use a reselection technique referred to as "handover" (or "handoff"). Handoff is described as "soft" when the procedure allows for a transition period during which control and/or user data traffic intended for a given communication device is routed to the device through more than one of the cells, in other words the device is permitted to "camp" on more than one cell.

Providing communication devices with coverage at cell edge typically requires more network resources; for instance transmission power needs to be higher in the downlink in order for the RF signal to propagate to the cell edge.

Release '99 of the W-CDMA Standard enabled the reuse of the same frequency at cell edge with soft handover (i.e. handover having a transition phase where a terminal effectively camps on both source and target cells).

In later releases of 3G RATs, however, HSDPA, for instance, has mainly removed in downlink the concept of soft handover: data is transmitted from only one cell to the terminal.

In many parts of the world, 4G RATs (such those compliant with the 3GPP standards known as Long Term Evolution (LTE)) are deployed. Like these later 3G releases, LTE uses universal frequency reuse (where cells sufficiently far apart operate on the same frequency) without soft handoff. Consequently, high levels of interference and low SINR (signal to interference plus noise ratio) can be expected near the cell edge. This means users at the cell edge in LTE (and HSDPA, etc.) require more radio resources (i.e. user plane resource blocks, control channel resource blocks, etc.) than users closer to the serving base transceiver stations (i.e. eNBs). Accordingly, the potential for the cell be impacted increases when there is an increase in the number and activity of users at/near to the cell edge.

LTE is also specified to handle different types of base transceiver station entities. The requirement for cellular communications coverage is far from uniform across a typical geographic area. Furthermore natural features or features of the built environment introduce additional constraints upon the operation of base station entities.

The most prevalent class of base transceiver station is the wide area eNodeB which provides coverage over a wide geographical spread (spanning distances of up to 20 km)—this is sometimes termed the "macro (layer) eNB" type. Such eNBs often provide more than one "cell" or sector.

Base transceiver stations of more limited transmit power than the macro eNBs, and typically providing one cell or sector, are referred to as micro eNBs.

Smaller cells may be provided by devices of even lower power: local area eNBs (or picocell base stations) and home eNBs (or femtocell base stations). The resulting femtocells and picocells are sometimes referred to generally as "small cells". These classes of base transceiver stations are typically used in areas where coverage would otherwise be inadequate or awkward to maintain using conventional eNB equipment. The main distinction between local area and home eNBs is that in the case of the home eNBs the location and control of the device lies with the end-user rather than the network operator; these devices conventionally offer communication services to a "white-list" of home-users rather than any network subscribers that happen to be within coverage.

LTE has a hierarchical architecture so that a wide area layer of coverage (the macro layer) may overlap or encompass geographic regions within the coverage of smaller cells (the "micro layer"). Nevertheless there may be a preference on behalf of the network operator to have uplink and/or downlink traffic for certain devices handed down to the micro layer; to free up capacity in the macro layer for devices that are out of micro layer coverage, for example.

Network operators wish to improve the efficiency of the use of their networks at or near cell edges.

It is known to address the cell edge problem by:
  Increasing the performance at cell edge, for instance by adding more and more complex software in the macrocells to improve the cell edge performance (usually within the area of the coordinated scheduling between adjacent cells). In certain cases, such as for the CoMP (Coordinated Multi Point) feature described in 3GPP Release 11, the improved cell edge performance brings with it the need for dedicated transmit (Tx) and receive (Rx) antennas associated with one or more macro eNBs.

Installing fixed Small Cells (i.e. local area eNodeBs) to increase system capacity.

The installation of fixed small cells by a network operator brings with it the burden of finding suitable locations, paying for the site rental, and deploying additional cables to connect the fixed Small Cells to other nodes of the network. Furthermore, installation and commissioning (including configuring) of fixed small cells takes time: even if wireless backhaul is used instead of cables, the fixed small cells need to be installed in a suitable position and configured for operation at that location. In some cases, this process may include the configuration and testing of directional antennas associated with such small cell devices which require the skills of a professional radio engineer. In addition, where the small cell device fails or otherwise requires servicing the device and the installation site needs to be accessible by the operator: since these devices are typically the property of the network operator but located on private land and in sometimes inaccessible locations, there are likely to be logistical and practical obstacles to intervention by one of the operator's engineers.

The LTE standards (Release 10 (and later) of the 3GPP) also describe two further Radio Access Network entities: relays and repeaters which can be used to address the problem of cell edges. Both types of entity provide extension of coverage for one cell of an existing base transceiver station.

A repeater is communicatively tied to a corresponding (typically macro) eNB, having a first antenna within a given cell (the "donor cell") of the eNB and a second antenna directed towards a coverage area where coverage extension is required. In certain instances, a repeater merely retransmits (i.e. re-broadcasts) a signal, received at a first frequency, at a second frequency, typically amplifying the repeated signal. Uplink and downlink signals may thus be conveyed through repeaters without any need for decoding.

Repeaters specified in Release 10 (and later) of the 3GPP standards decode the (incoming) signal and then recode and retransmit that signal: this new class of repeater is referred to as a "relay".

A relay is also communicatively tied to a corresponding eNB. It too has a first antenna within a given cell (the "donor cell") of the eNB and a second antenna directed towards a target coverage area. Relays however form their own cells and operate in many ways as base transceiver stations in their own right. Relays decode the signals from the donor cell, applying any necessary error correction, and make decisions about how radio resources (such as the channels within each radio subframe) are assigned.

The known approaches typically require the provision of dedicated and additional radio network equipment to assist in the extension of cell coverage. Such equipment is typically fixed in location and requires careful planning.

It is desirable to provide a system that allows the extension of coverage in a cellular network that can be deployed dynamically without requiring the siting of additional radio equipment near regions of poor radio coverage.

SUMMARY OF THE INVENTION

According to a first aspect of present disclosure there is provided a system for providing an aggregator facility in a telecommunications network; the system comprising: a core network, CN; and a radio access network, RAN, which is configured to provide a backhaul connection to the CN and to provide wireless communication connections to radio communication devices; wherein the system further comprises: a first communication device, the first communication device having a first connection to the CN, the first connection path including a wireless connection between the RAN and the first communication device; a second communication device; and an aggregator controller, which communicates with the RAN and the CN and which is configured to instruct the second communication device to establish an aggregation connection to the first communication device and a second connection between the first communication device and the CN, wherein the second connection included the aggregation connection and the instruction is dependent upon performance conditions.

The second connection may be used instead of the first connection to the CN; alternatively the second connection may be used in addition to the first connection to the CN.

In certain embodiments, the aggregation connection is a wireless connection.

In certain embodiments there are a plurality of first communication devices. Where there are more than one first communication device, the aggregation connection transports aggregated data from the first communication devices, the data from each first communication device being packetized for backhaul to the core network.

In certain embodiments, the second communication device may be a user equipment (UE) whose user has indicated that the UE may be dynamically assigned to act as an "aggregator".

In certain embodiments, the second connection further includes a second wireless connection to the RAN and the backhaul connection from the RAN to the CN. Where the second communication device is a user equipment (UE), the second wireless connection may be established using a SIM card specific to that device to authenticate the device to the CN.

In certain alternative embodiments, the second connection further includes a connection using at least one connection technology selected from: optical fibre cable technologies; Ethernet technologies; a fixed line xDSL technology; microwave backhaul technology; and/or a Wi-Fi technology. In the case of Wi-Fi technology, the connection may thus comprise a Wi-Fi section from second communication device to a Wi-Fi access point and a fixed line section from the Wi-Fi access point to the core network. Fixed line xDSL and optical fibre connections may be either direct or indirect; in the indirect case, the connection may be established via at least one intervening network entity.

In certain embodiments, the second communication device may be a dedicated communication device specifically deployed to act as an aggregator. Alternatively or additionally, the second communication device may be a small cell base transceiver station, for example, a home eNodeB (HeNB).

In certain embodiments, the aggregator controller is independent of the RAN. The controlling functionality (which could be implemented, for example, as a software) is thus placed in an entity that is typically external to the eNodeBs. This external entity is configured to establish a communication channel with selected terminals (or other communication devices) that are capable of acting as aggregators for other terminals in the network. When each of these selected terminals acts as aggregators for one or more other terminals in the network, the latter are connected to the CN via a secondary connection which is different from the primary connection they would have when connected with the CN via the RAN. These connections are primarily logical connections between the terminals and the CN. The secondary connection will include a communication channel between the selected terminal and the one or more other terminals in the network for which the selected terminal acts as an aggregator (hereafter, we will call the selected terminal "aggregator"). The aggregator will communicate with each of these other terminals and combine their communication streams before they are transmitted to the Core Network. In certain cases, the external entity is configured to establish further parallel communication channels with other communication devices: this may be useful when determining the locations of communication devices more generally rather than candidate aggregators alone, as may be needed in certain embodiments.

As a result, the system may be deployed without requiring bespoke adaptations of otherwise conventional eNodeBs to include dedicated software functionalities. The introduction of a separate controller entity means that the system may be implemented in association with any conventional macrocell layer deployment.

Furthermore the system requires neither changes in network architecture nor new stricter requirements in synchronization, backhaul, etc.

As a user may obtain (and to some extent control the positioning of) candidate aggregators, the users of the network may also benefit in that they are able to influence the overall coverage of the macrolayer by their own actions.

In certain embodiments, the performance conditions upon which the instruction to the second communication device to establish the second connection depends include a metric of coverage quality and/or usage of resources in the network being greater than a threshold level. This metric may be a metric of a level of interference in the network. In particular, this level of interference may be one due to the use of the first connection. The threshold level is an estimate (which can be predetermined) of a level of interference due to the use of the second connection.

In certain embodiments, the instruction to establish an aggregation connection may be conditional upon performance conditions associated with the second communication device. This may be in addition to the metric discussed above. The performance conditions associated with the second communication device may include parameters associated with the connection between the second communication device and the RAN. The performance conditions associated with the second communication device may include at least one of SINR, received signal received power (RSRP), location information, and battery life.

In certain embodiments, the aggregator controller may be further configured to process the performance conditions associated with the second communication device and, only if the parameters are determined to indicate that the second communication device is a candidate for assignment as an aggregator, to instruct the second communication device to establish the aggregation connection to the first communication device According to a further aspect of present disclosure there is provided a communication device for providing an aggregator facility in a telecommunications network having a core network, CN, and a radio access network, RAN, the communication device comprising: a communication unit configured to establish an aggregation connection to at least one nearby communication device and to establish a second connection between the at least one nearby communication device and the CN, and a processor unit configured to report device status information to an aggregator controller, to receive instructions from the aggregator controller, said instructions being dependent upon performance conditions including the reported device status, and to enable the aggregation connection in accordance with the instructions.

In certain embodiments, the processor is configured to report device status information including information selected from: the location of the communication device, accuracy of the location, supported RAT technologies, supported RAT frequency bands, battery characteristics, mobility state, and/or current battery drain consumption.

In certain embodiments, the processor is configured to enable the aggregation connection by establishing an aggregation cell at a frequency band different from an operating frequency band of the RAN.

In certain embodiments, the processor is configured to enable the aggregation connection by establishing an aggregation cell using a wireless communication technology different from a wireless communication technology used by the RAN.

In certain embodiments, the processor unit is further configured to enable the second connection by enabling the communication unit, the second connection including the aggregation connection and a wireless connection between the communication device and the RAN.

Certain embodiments of the aggregation cell serve more than one nearby communication device. In these embodiments, the wireless connection aggregates a data traffic for each of the nearby communication devices into an aggregated payload, thereby making more effective use of the wireless connection.

In certain embodiments, the communication device for providing an aggregator facility corresponds to the second communication device in the system described above and may implement any of the functionalities of the equivalent second communication device in the system described above.

According to yet another aspect of the present disclosure there is provided a controller entity for controlling an aggregator facility in a cellular telecommunication network, wherein the network has a core network, CN, and a radio access network, RAN, and serves at least one first communication device, the controller entity comprising a network interface unit configured to provide an interface to the CN and controller unit configured: to obtain performance condition information for a region of the telecommunication network, to determine whether a second communication device provides aggregator functionality to said at least one first communication device, and to instruct the second communication device to establish an aggregation connection to the first communication device in dependence upon the determination.

In certain embodiments, the performance conditions include conditions associated with a communication link between the or each first communication device and an eNB in the RAN, and the controller unit is configured to determine whether a second communication device provides aggregator functionality by determining whether the performance conditions match trigger conditions.

In certain embodiments, the controller unit is configured to instruct the second communication device to establish an aggregation connection by assigning a second communication device to operate in the aggregator mode, upon receipt of an indication that performance conditions match the trigger conditions, and commanding the first communication device to switch at least a portion of its data link from the eNB to the second communication device in aggregator mode, wherein aggregator mode is a mode in which the second communication device is configured to aggregate data traffic from one or more of said first communication devices.

In certain embodiments, the performance conditions include conditions related to the location of one or more second communication device and the controller unit is further configured to obtain performance condition information repeatedly at time intervals and to determine whether a second communication device provides aggregator functionality on successive occasions in dependence upon the performance condition information thus obtained, thereby updating the determination. In certain embodiments, the conditions related to the location of one or more second communication device indicate whether each second communication device is static for a duration sufficient to allow effective aggregator functionality.

In certain embodiments, the controller unit is configured to activate the network interface unit in dependence upon the performance condition information, thereby activating an aggregator layer in the telecommunication network. In certain embodiments, the processing means is configured to deactivate the network interface unit in dependence upon the performance condition information, thereby deactivating an aggregator layer in the telecommunication network.

In certain embodiments, the performance condition information includes location information for the at least one first communication device and the controller unit is further configured to determine whether a second communication device provides aggregator functionality in dependence upon the location information for the at least one first communication device.

There is further provided computer software operable, when executed on a computing device, to cause one or more processors to perform the computer implemented method according to the above aspects of the present disclosure.

In certain embodiments, the controller entity corresponds to the aggregator controller in the system described above and may implement any of the functionalities of the aggregator controller in the system described above.

A further aspect provides machine-readable storage storing such a program.

Various respective aspects and features of the present disclosure are defined in the appended claims.

It is an aim of certain embodiments of the present disclosure to solve, mitigate or obviate, at least partly, at least one of the problems and/or disadvantages associated with the prior art. Certain embodiments aim to provide at least one of the advantages described below.

BRIEF DESCRIPTION OF THE DRAWINGS

Various embodiments of the present disclosure will now be described with reference to the accompanying drawings, in which:

FIGS. 1A to 1C illustrate an embodiment of the present disclosure where communication devices are dynamically assigned as aggregators within a single cell;

FIGS. 2A and 2B illustrate a further embodiment of the present disclosure where communication devices are dynamically assigned as aggregators within a multicell network;

FIG. 3 illustrates the functional elements of an aggregator controller suitable for enabling, controlling and disabling an aggregator layer in the network architecture of the present disclosure;

FIG. 4 illustrates the behaviour of nearby communication devices when the aggregator controller of FIG. 3 enables an aggregator layer at a given aggregator; and FIG. 5 illustrates the functional elements of a communication device suitable for use in the network architecture of the present disclosure.

DETAILED DESCRIPTION OF PREFERRED EMBODIMENTS

The present disclosure relates to a telecommunications network architecture that includes a radio access network (RAN), a core network (CN) and a packet data network (PDN). Communication devices, such as mobile terminals, user equipment (UEs) and wireless access stations, establish wireless connections to the network by means of the RAN.

Figure 1B:
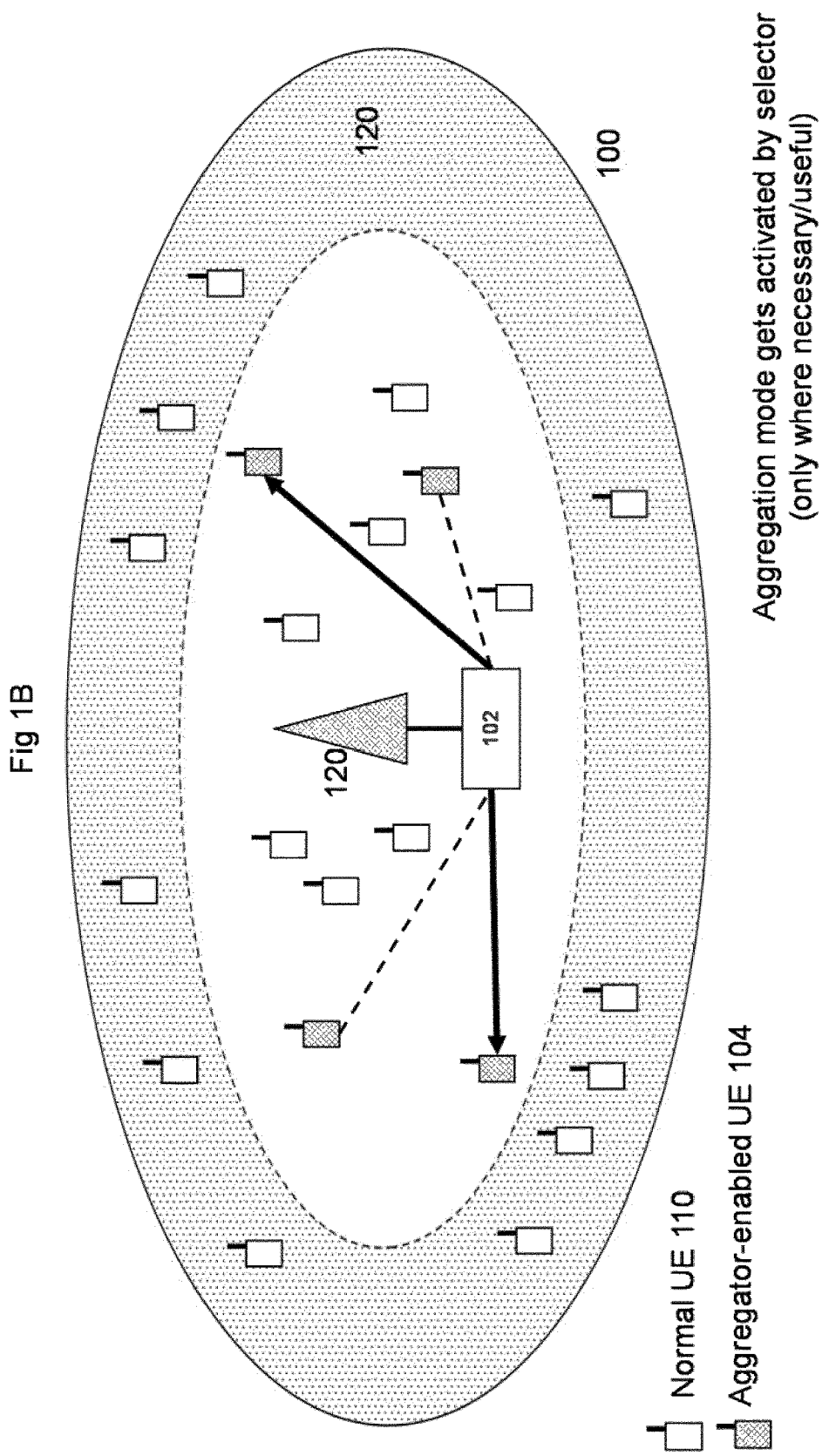
Figure 1C:
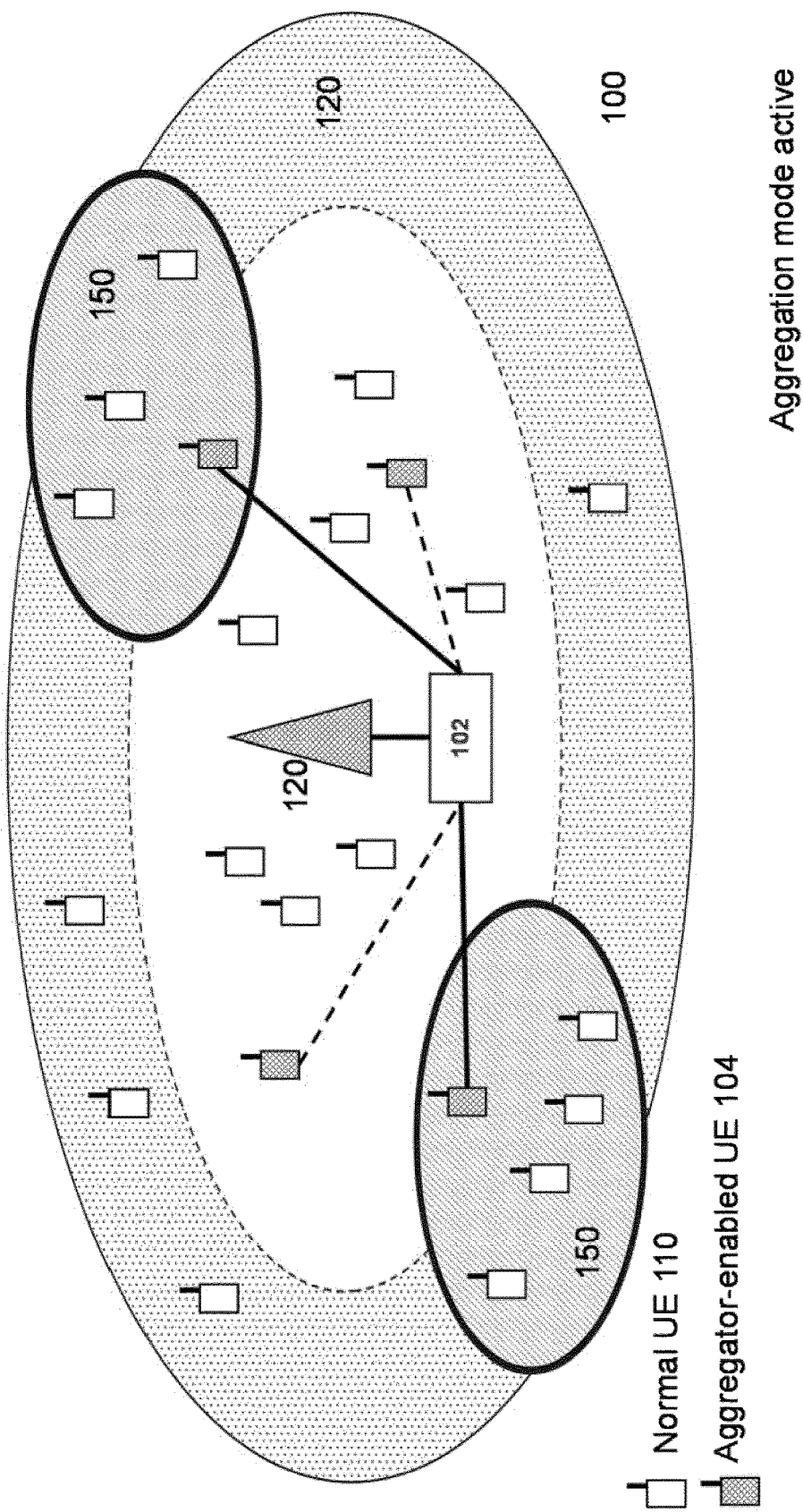

FIGS. 1A to 1C show a single cell 100 of the telecommunications network provided by a base transceiver station (i.e. macro eNB) 120 within the RAN. The telecommunications network architecture further comprises a network node, referred to as an aggregator controller (AC) 102, which communicates with the RAN and the CN (illustrated here as a link between the AC 102 and the eNB 120) but which may be implemented independently of the component entities of either RAN or CN. The AC 102 is configured to interrogate one or more communication devices 104, where these devices are connected to the RAN (i.e. the eNB 120), to determine certain parameters associated with the device 104 and/or its connection to the RAN (e.g. SINR, reference signal received power (RSRP), receive signal code power (RSCP), location information, battery life, etc.). Data associated with the parameters is processed at the AC 102 and, if the parameters are determined to indicate that the or each communication device 104 is a candidate for assignment as an aggregator, configuring the communication device 104 to implement an aggregator mode, whereby it provides base station functionality for nearby (mobile) communication devices 110. In FIGS. 1A to 1C, the communication devices 104 are illustrated as UEs: this is merely one example of a candidate aggregator, communication devices 104 may equally be dedicated communication devices or even small cell base transceiver stations such as HeNBs or femtocell eNBs.

One scenario where the facility extending base station functionality to nearby (mobile) communication devices 110 is contemplated is illustrated in FIGS. 1A to 1C. As communication devices approach the furthest range of macrocell coverage in the cell (i.e. the cell edge), they consume more network resource. By selecting certain communication devices to act as aggregators, these devices being within good macrocell coverage but having the facility to extend base station functionality within an "aggregator cell" beyond the coverage of the macrocell layer, the network can deploy aggregators to address the problems of cell edge.

In certain embodiments of the present disclosure, therefore, certain network-connected communication devices 104 are used as a type of small cell entity. Network-connected communication devices assigned to perform this small cell-like functionality are termed "aggregators" because, where there are more than one communication devices 110 nearby a given network-connected communication device in aggregator mode 104, the data traffic from the nearby communication devices 110, for each of the nearby communication devices 110, is buffered for transport (i.e. "aggregated") using a backhaul connection between the aggregator 104 and the core network. By aggregating the data from one or more nearby communication devices 110, the aggregator can both (a) assist in extending the network coverage to locations where (i) the macrolayer coverage is otherwise either temporarily or permanently inadequate or (ii) the macrolayer coverage is adequate but devices within a certain coverage area (e.g., cell edge) consume too many resources and (b) transport data over the RAN more efficiently. One of the advantages of buffering data from the nearby communication devices 110 is that the backhaul connection from the aggregator 104 (which may be considered as a single logical "pipe") can be made less "bursty" reducing signal resource consumption.

Aggregators are typically, dynamically switched-on and off in dependence upon conditions affecting the performance of the network. These performance conditions include both network conditions (such as interference, load, etc.) and other conditions that could affect the performance of the system (such as the predicted level of activity in the cell at a given time or date, the presence and/or number of candidate aggregators in suitable locations, the distribution of UEs in cell edge locations, and/or the level of resource consumption by communication devices in the potential coverage area of respective candidate aggregators).

In the illustrated embodiment, the coverage of the existing macro layer is used for backhaul and a technology/band different from the one used for the backhaul is used as a radio interface for extending the coverage to nearby (mobile) communication devices 110. The coverage extension is therefore supplied to nearby communication devices 110 by aggregators operating "out-of-band" with respect to the macrolayer operating frequencies.

In one example, the macrolayer operates using LTE carriers at frequency bands around 800 MHz or 1800 MHz while the cell provided by the aggregator to nearby communication devices operates at 2600 MHz. In another example, the macrolayer operates using LTE carriers at frequency bands around 2600 MHz using an FDD technology while the cell extension provided by the aggregator to nearby communication devices operates at 2600 MHz in a TDD technology. Furthermore, the reader will appreciate that further out-of-band frequency bands may be available at frequencies for which no licensee is needed, such as the 2.4 GHz and 5 GHz bands used by conventional WiFi technologies (i.e. compliant with the IEEE 802.11 family of standards).

It will be appreciated that in many instances aggregators and candidate aggregators are themselves mobile. While in certain embodiments, it is a requirement that the aggregator is static when active, it is also contemplated that the aggregator may be moved to another site and activated at the new site—such communication devices are referred to as "nomadic", as distinct from "fixed" devices. One specific example of a nomadic device arises when the candidate aggregator is installed in a motor vehicle, such as a commuter's car: the vehicle is driven from a home location (where it may be static) to an office location (where, after the journey is complete, the device may again be unmoved throughout the working day).

The decision of which UEs 104 (or other network-connected communication devices) will act as aggregator is taken by the Aggregator Controller, AC, 102, a central logical entity (e.g. a server), which may or may not be integrated within the elements of the 3GPP Radio Access Network.

Certain embodiments of the AC 102 obtain information from all network-connected communication devices in a given sector before determining which of these devices can act as aggregators by virtue of the device status and current location. This determination is repeated for respective sectors at intervals of time: in certain cases, the intervals are equal in duration, while in others, the intervals are of variable duration and may be adapted to the known or predicted behaviour of communication devices using the network.

The AC may further repeatedly determine whether, on a set of basic criteria (i.e. performance conditions such as the network conditions, the current location and status of communication devices, etc.), any devices in a given sector should enter into service as aggregators at all. The criteria may include a measure of the comparative benefit of introducing an aggregator facility compared to having no aggregator facility in a given sector.

The AC is capable of establishing, maintaining and deactivating communications with those UEs (or other network-connected communication devices) determined to have the capability to act as aggregators (e.g. through an application layer carried over the user plane of the macro layer) in order to:

obtain information from all the UEs that can act as aggregators 104, this information may include performance factors such as location and its accuracy, supported RAT technologies/bands, battery characteristics, status, and current battery drain consumption; and/or provide commands to the aggregators 104 such as: commands to set-up an aggregator control layer using some specific algorithm depending upon performance conditions such as those obtained from the aggregators 104, to select the RAT/band to be used in such a layer, to start transmission, to send handover commands to the aggregated UEs (i.e. the nearby communication devices 110 served by the aggregators 104), to stop transmission, and/or to send information to the aggregator control layer.

In certain embodiments, the AC 102 might communicate with the LTE eNodeB or 3G RNC in order to "move", via handover to a specific RAT/frequency, a terminal (or other communication device) that is set to act as an aggregator 104. This move may be a change in serving cells: in such cases the communication with the LTE eNodeB or RNC is a request for a handover of the aggregator 104 from a current cell to a neighbouring cell: communication with the eNodeB or RNC is necessary then since handovers are under the control of the LTE eNode (for 3G, the control is done by the RNC). The move might also be a forced reselection: in which case communication with the LTE eNodeB would be unnecessary.

In certain embodiments, the AC 102 may establish a further direct communication with "normal" UEs 110 (i.e. those not currently assigned to act as aggregators). This direct communication may be through a preinstalled application, for instance, configured to gather further performance information such as the strength/quality of received signals in the cell 100 in which the normal UEs 110 are camped/connected, and/or data on the strength/quality of received signals in other RATs/band, and/or location information.

In certain embodiments, the aggregation enabled communication devices 104 (i.e. aggregators or candidate devices) are also relay nodes. Such devices may transfer data for one group of network-attached communication devices as a conventional relay node, while serving another group of network-attached communication devices as an aggregator.

The aggregator is distinct from a typical relay node in a number of respects. Firstly, relay nodes are tied to a particular donor cell. They are presumed to be static and entirely under the control of the network operator via the eNB providing the donor cell. Furthermore, relay nodes are typically operated using radio resources allocated to them by the donor cell and are thus integrated in the scheduling for the macrocell. In logical terms a connection from a communication device to the core network via a relay node is the same logical connection as that between the communication device and the core network via the donor eNB: resource that would be allocated within the macrolayer for the direct connection from communication device to eNodeB is instead allocated to the indirect connection via the relay unit.

The macrolayer and the aggregator provide separate logical connections between the Core Network and communication device, with the aggregator being "configurable" to provide this connection. Whereas the relay node provides an alternative physical route provided the communication device camps on the relay cell rather than the donor cell, the aggregator controller ensures that the network can control whether a given candidate (or group of candidates) for aggregator is enabled (i.e. enters into service as an aggregator) and thus determines the conditions under which the communication device switches between a connection established by the RAN and a connection established by the aggregator (when instantiated).

Figure 2B:
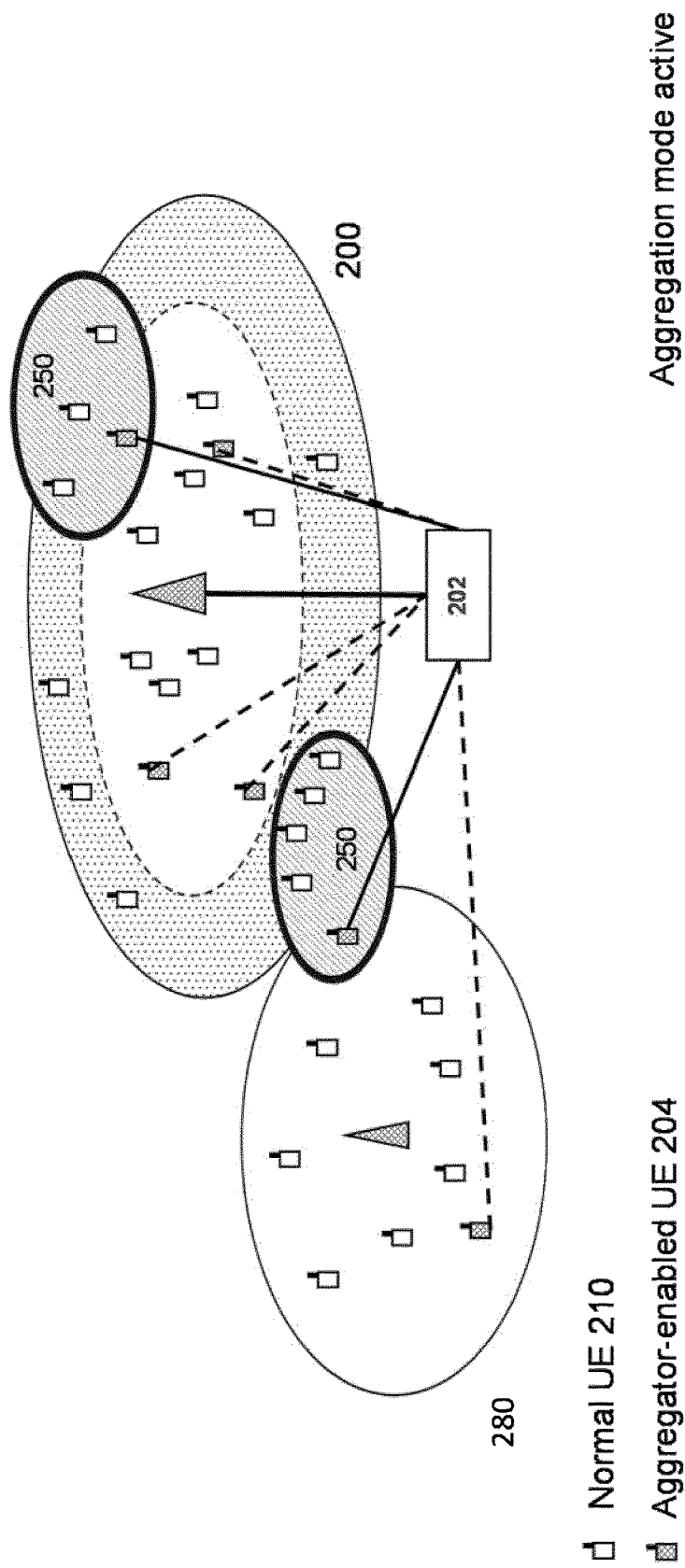

The aggregator is not however merely a "temporary" base transceiver station. As the aggregator is activated and deactivated ad hoc (i.e. opportunistically) based on the need of the RAN as a whole, it is contemplated that certain communication devices 204 camped on neighbouring cells 280 could be assigned aggregator status (see FIGS. 2A and 2B). Such aggregators can be arranged to provide more effective base station functionality to communication devices in the cell 200 currently serving a conventional communication device 210. While that aggregator 204 would normally be outside the reach of the serving cell 200, it can nevertheless be activated, via the AC 202. This highlights another advantage of the AC 202. Because it is not associated specifically with a cell 200, but rather with a network which may include more cells (200, 280), the AC 202 is able to have a "broader" view of the network and activate aggregator facilities 204 which sits outside the coverage of a cell 200 but can nevertheless serve communication devices 210 within cell 200 thus providing an overall benefit to the network.

FIG. 3 illustrates the functional elements of an aggregator controller 300 suitable for enabling, controlling and disabling an aggregator layer in the network architecture of the present disclosure. These functional elements may be implemented as software routines and/or as dedicated hardware units, these elements being substantially interchangeable.

The functional elements include a communication module 320 for obtaining information from potential aggregators by establishing communication via an application layer with these devices. The information obtained contributes to the factors affecting the performance of the network upon which the establishment of a connection between aggregators and nearby communication devices depends and may include: current location (e.g. location information derived from satellite positioning systems, such as Global Positioning Satellite, GPS); historical information (covering, for example, the last two weeks) of the location of the candidate aggregator; level of physical mobility at present (i.e. whether moving or not); a measure of LTE radio coverage in the macrolayer; an indicator of battery level, current consumption, expected remaining battery etc.; information concerning neighbour cells of the aggregator, in respect of the connection between the aggregator and the macrolayer RAN; and a measure of the improvements (or otherwise) expected, after switching on an aggregator layer in a specific region of the radio network, the improvements being measured in terms of latency (i.e. data waiting time), for example. This information may be made available in the application layer through an aggregator client application executing on the respective aggregator candidate devices.

One reason for obtaining such information relates to the nature of the devices that are candidates. It is likely that many of the candidate aggregators are in fact "nomadic", changing (i.e. commuting) between two or more static locations over a period of hours or days. Thus for many candidate devices the characteristics of the network will change as they move within the network: a communication device that is a suitable candidate aggregator at a given location, X, and a given time, T, may not be suitable elsewhere, X+x, at a later instant, T+t: specifically if the location is close enough to extend an aggregator cell to the (macrolayer) cell edge at T, but out of range of the cell edge at T+t. Thus the controller 300 needs to obtain this information to inform decisions as to whether the communication device is (currently) a candidate aggregator and whether, if a candidate aggregator, it should be activated/deactivated as an aggregator.

Optionally, the communication module 320 may be configured to obtain additional information from communication devices other than aggregators; this additional information being analogous to the information obtained from candidate aggregators and similarly contributing to the factors affecting the performance of the network upon which the establishment of a connection between aggregators and nearby communication devices depends. A specific non-aggregator client application may be installed in some or all of the communication devices within a network to provide this additional information.

The communication module 320 may also be configured to obtain macrolayer information (i.e. data concerning network conditions) from the macrolayer concerning the current level of resource consumption of the schedulers, coverage maps and (if available) real time traffic maps.

The functional elements include a selection module 330 for selecting (and communicating to) the aggregators that have to start the transmission of an aggregator cell and for determining which of the supported technology/frequency bands the selected aggregators is to use in operation.

A monitoring module 340 is also provided to evaluate performance conditions (such as the network conditions and other conditions affecting performance) to determine which of the currently selected aggregators will continue their transmission.

In cases where a change in aggregator is indicated by the monitoring module 340, the selection module 330 may be further configured to selecting (and communicate to) those aggregators which should stop their transmission (and thereby cease to be in service as an aggregator).

When enabling an aggregator layer in a given sector or cell of a radio network, the aggregator controller first instructs one or more communication devices (preselected to act as aggregators) to start radiating coverage (i.e. to implement an aggregator "cell").

In FIG. 4, the activity of communication devices nearby an active aggregator are illustrated. Once a given aggregator starts radiating coverage to its own cell 405, the behaviour of nearby communication devices adapts accordingly.

Nearby communication devices (i.e. terminals, such as UEs) that are in idle mode will automatically camp on the newly established aggregator cell 420 (by virtue of the conventional idle mode reselection of the cell with the strongest signal strength coupled with the prioritization of LTE layers broadcast by the LTE eNodeB). If the nearby idle device thereafter enters an active mode 430, transmission starts (or does not start) over the aggregator cell 440. Where there is an ongoing existing connection through the macrolayer of the RAN (i.e. it is determined that the nearby communication device is active on the macrolayer) 410, the RAN may optionally, upon request from the aggregator controller, move (i.e. hand-off) the ongoing communication of the respective nearby device towards the aggregator cell 415. If such a request is made, transmission starts (or proceeds) over the aggregator cell 440.

FIG. 5 illustrates the functional elements of a communication device 500 suitable for use as an aggregator in the network architecture of the present disclosure.

The communication device 500 includes a memory 510, location unit 520, a processor 540, input/output devices 550 and a network interface unit 560 having a transceiver module 565. Data is transferred between the various components via a bus 545. To operate as an aggregator, the network interface unit 560, through its transceiver module 545 must be capable of establishing two separate network interfaces: a backhaul interface and a coverage extension interface. In certain embodiments the transceiver module operates in at least two sets of frequency bands: one set of bands that correspond to the RAT of the macrolayer and a further "out-of-band" set of frequencies not used by the RAT. In some cases, communications on the "out-of-band" set of frequencies use a different RAT from the macrolayer.

In certain embodiments, the backhaul and the coverage extension interface might use the same working frequency/RAT as a classical Relay Node in order to facilitate the deployment of multi-hop scenarios, in which chains of Radio Access Network entities are deployed. For example, a first aggregator may appear to other communication devices as a Donor eNodeB and a second aggregator may appear to the first aggregator as a conventional UE while providing its own cell to nearby communication devices appearing to them as a conventional Relay Node.

The location unit 520 may include a global positioning satellite (GPS) unit or the like to provide location information for the communication unit 500 as well as cell synchronization if other methods are not available.

While not shown, the communication device 500 may be powered from a battery—such as a rechargeable Li-ion battery, conventional in the field of portable cellular communication devices, such as smartphones.

Certain embodiments of the present disclosure provide an architecture similar to the so-called MiFi® architecture (in which a wireless router appears to the macrolayer as a conventional terminal and simultaneously acts as a mobile Wi-Fi hotspot). In this architecture, the aggregator only provides packet switched services to conventional communication devices (i.e. UEs or MTC terminals) using WiFi technology and frequency bands, whilst these devices maintain circuit switched services (e.g. voice calls) through the macro layer. Alternative embodiments of the present disclosure provide an architecture analogous to a (heterogeneous) arrangement of dynamic small cells, in which the aggregator acts like a small cell for any given terminal (i.e. communication device).

Both architectural options can coexist in the same area, but each aggregator can work with only one option at the time; this means that within the coverage area of a given cell, some aggregators can use, e.g. the Mi-Fi architecture, others can use the dynamic Small Cell architecture.

Release 10 of the 3GPP introduced the facility for Carrier Aggregation: whereby up to five LTE RF carriers (not necessary contiguous on the spectrum and often in more than one operating frequency band) may be logically combined in a single LTE connection to increase peak and average throughput for the resulting connection. Under Carrier Aggregation, certain portions of the data traffic may be assisted by the presence of an aggregator while other portions may not: the communication device having an LTE connection to the core network may therefore support portions of that connection using physical connections via both the macro eNB and the aggregator.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing description refer to LTE, it should be noted that the system described may equally be deployed in telecommunications networks based on other cellular telecommunication architectures, for example 2G, 3G, future evolutions of LTE, future architecture (e.g., 5G), WD-CDMA and WiMAX. This is an important aspect as the above system is agnostic to the specific type of RAN used. In other words, the aggregator controller/controller entity can work with any RAN and/or combinations of RANs. This is, for example, one of the reasons why in certain embodiments the aggregator controller/controller entity is independent of the RAN. Similar observations apply for the communication device for providing an aggregator facility.

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A system for providing an aggregator facility in a telecommunications network; the system comprising:
   a core network, CN; and
   a radio access network, RAN, which is configured to provide a backhaul connection to the CN and to provide wireless communication connections to radio communication devices;
   a first communication device, the first communication device having a first connection to the CN, the first connection including a wireless connection between the RAN and the first communication device;
   a second communication device; and
   an aggregator controller, which communicates with the RAN and the CN, and which is configured to instruct the second communication device to act as a base station entity, wherein the instruction is dependent upon performance conditions, wherein upon instruction to act as a base station entity the second communication device is configured to start radiating an aggregator cell, act as a base station entity and provide at least one base station functionality to the first communication device, and wherein the aggregator cell enables the first communication device to establish an aggregation connection with the second communication device to thereby enable a second connection between the first communication device and the CN, wherein the second connection includes the aggregation connection.

2. A system as claimed in claim 1, wherein the second connection further includes a second wireless connection to the RAN.

3. A system as claimed in claim 1, wherein the second connection further includes a connection using at least one connection technology selected from: optical fibre cable technologies; a fixed line xDSL technology; microwave backhaul technology; and/or a Wi-Fi technology.

4. A system as claimed in claim 1, wherein the RAN includes at least one macro cell base station entity.

5. A system as claimed in claim 1, wherein the performance conditions upon which the instruction to the second communication device to establish the second connection depends include a metric of coverage quality and/or usage of resources in the network being greater than a threshold level.

6. A system as claimed in claim 5, wherein the metric is a metric of a level of interference due to the use of the first connection.

7. A system as claimed in claim 5, wherein the threshold level is an estimate of a level of interference due to the use of the second connection.

8. A system as claimed in claim 1, wherein the instruction to establish an aggregation connection is further conditional upon performance conditions associated with the second communication device.

9. A system as claimed in claim 8, wherein the performance conditions associated with the second communication device include parameters associated with the connection between the second communication device and the RAN.

10. A system as claimed in claim 8, wherein the performance conditions associated with the second communication device include at least one of SINR, received signal received power (RSRP), location information, and battery life.

11. A system as claimed in claim 8, wherein the aggregator controller is further configured to process the performance conditions associated with the second communication device and, only if the parameters are determined to indicate that the second communication device is a candidate for assignment as an aggregator, to instruct the second communication device to establish the aggregation connection to the first communication device.

12. A system as claimed in claim 1, wherein the second communication device is one of a user equipment (UE); a dedicated aggregator device; a machine type communication (MTC) device; an access point; wireless station; or small cell station.

13. A system as claimed in claim 1, wherein the aggregator controller is further configured to instruct the second communication device to deactivate the aggregation connection to the first communication device in dependence upon further performance conditions.

14. A system as claimed in claim 13, wherein the instruction to deactivate the aggregation connection is further conditional upon performance conditions associated with the second communication device.

15. A method for providing an aggregator facility in a telecommunications network comprising: a core network, CN; and a radio access network, RAN, which is configured to provide a backhaul connection to the CN and to provide wireless communication connections to radio communication devices; the method comprising:

providing a first connection from a first communication device to the CN, the first connection having a path including a wireless connection between the RAN and the first communication device;

at a second communication device, receiving an instruction to act as a base station entity, wherein upon instruction to act as a base station entity, the second communication device starts radiating an aggregator cell, acts as a base station entity and provides at least one base station functionality to the first communication device thereby enabling the first communication device to establish an aggregation connection with the second communication device, wherein the instruction is dependent upon performance conditions, and wherein the instruction is received from an aggregator controller, which communicates with the RAN and the CN; and at the first communication device (110; 210), establishing an aggregation connection with the second communication device (104; 204), thereby enabling a second connection between the first communication device (110; 210) and the CN, the second connection including the aggregation connection.

16. An aggregator controller for controlling an aggregator facility in a telecommunications network, wherein the telecommunications network has a core network, CN, and a radio access network, RAN, which is configured to provide a backhaul connection to the CN and to provide wireless communication connections to radio communication devices including at least a first communication device having a first connection to the CN and a second communication device, the first connection including a wireless connection between the RAN and the first communication device, wherein the aggregator controller comprises:

a network interface unit configured to provide an interface to the CN and a controller unit configured to:

obtain, through the network interface unit, performance condition information for a region of the telecommunications network; and instruct, through the network interface unit and in dependence upon the performance condition information, the second communication device to act as a base station entity so as to start radiating an aggregator cell and provide at least one base station functionality to the first communication device, wherein the aggregator cell enables the first communication device to establish an aggregation connection with the second communication device thereby enabling a second connection between the first communication device and the CN, the second connection including the aggregation connection.

* * * * *